(12) United States Patent
Kokku et al.

(10) Patent No.: US 6,829,637 B2
(45) Date of Patent: Dec. 7, 2004

(54) DISTRIBUTED SHARED MEMORY FOR SERVER CLUSTERS

(75) Inventors: Ravindranath Kokku, Austin, TX (US); Ramakrishnan Rajamony, Austin, TX (US); Freeman Leigh Rawson, III, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 645 days.

(21) Appl. No.: 09/915,667

(22) Filed: Jul. 26, 2001

(65) Prior Publication Data

US 2003/0023702 A1 Jan. 30, 2003

(51) Int. Cl.[7] .............................................. G06F 15/00
(52) U.S. Cl. ...................... 709/216; 709/201; 709/223; 709/249
(58) Field of Search ................. 709/216, 223, 709/249, 201

(56) References Cited

U.S. PATENT DOCUMENTS 6,427,063 B1 * 7/2002 Cook et al. ................. 434/350
6,606,316 B1 * 8/2003 Albert et al. ............... 370/389
6,628,654 B1 * 9/2003 Albert et al. ............... 370/389

* cited by examiner

Primary Examiner—Reba I. Elmore
(74) Attorney, Agent, or Firm—Joseph P. Lally; Casimer K. Salys

(57) ABSTRACT

A system comprising a cluster of diskless servers employing a distributed shared memory abstraction that presents an area of shared memory for two or more processes executing on different servers in the cluster. The invention provides the appearance of a shared memory space between two or more processes thereby potentially reducing disk latency or eliminating redundant computation associated with conventional server clusters. The DSM abstraction may be dynamically alterable such that selectable groups of processes executing on the cluster share a common address space temporarily. The shared memory spaces may be determined empirically or servers may subscribe to a group reactively in response to client requests. Multiple groups may exist simultaneously and a single server may belong to more than one group. The types of objects to which the abstraction is applied may be restricted. Shared memory may be restricted, for example, to read-only objects to alleviate consistency considerations.

24 Claims, 3 Drawing Sheets

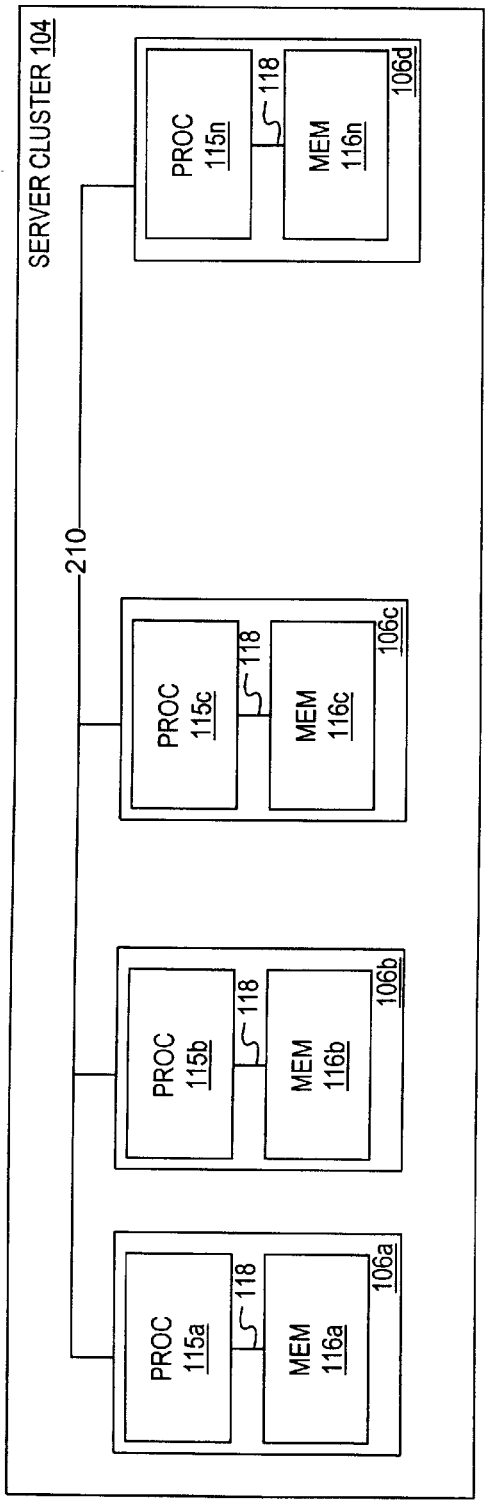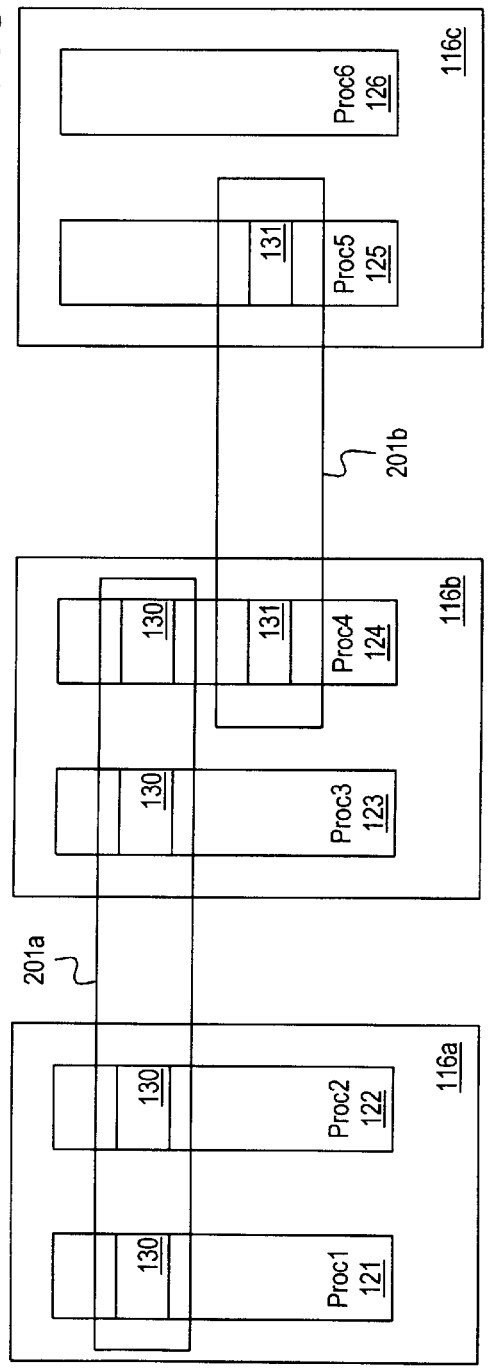
FIG. 2A
FIG. 2B

DISTRIBUTED SHARED MEMORY FOR SERVER CLUSTERS

BACKGROUND

1. Field of the Present Invention

The present invention generally relates to the field of data processing networks and more particularly to a system and method for incorporating distributed shared memory into a cluster of server appliances to improve performance.

2. History of Related Art

In the field of data processing networks, the emergence of networked storage has produced in an increase in the number of web-based application services implemented as a farm or cluster of diskless servers (also referred to herein as thin servers). In such an environment, the application service executes on a diskless device while content, programming, and data are stored on a distributed set of disks, which are themselves attached to specialized thin servers dedicated to disk block, file, and data base service. While such systems may reduce overall network cost by optimizing disk resources, they may also result in degraded performance in comparison to more traditional arrangements in which each server executing application subsystems includes one or more local disks on which the appropriate programs and data are stored. It would therefore be desirable to implement a diskless-based server cluster performance characteristics that is competitive with disk based systems. It would be further desirable if the invention did not substantially increase the hardware required to implement the solution.

SUMMARY OF THE INVENTION

The problem identified above is in large part addressed by a network and system in which a cluster of diskless servers employ a distributed shared memory (DSM) abstraction that presents an area of shared memory for two or more servers in the cluster. By providing the appearance of an area of shared memory between two or more servers in the cluster, the invention potentially improves performance by reducing or eliminating the disk latency associated with conventional server-cluster designs. The DSM abstraction may be dynamically alterable such that selectable groups of servers in the cluster share an area of memory temporarily. Server groups that share a memory area may be determined empirically or servers may subscribe to a group reactively in response to client requests. Multiple groups may exist simultaneously and a single server may belong to more than one group. The DSM implementation may be simplified by restricting the types of objects to which the abstraction is applied. In an embodiment suitable for use in many common web server applications, for example, address space sharing may be restricted to read-only objects thereby greatly alleviating coherence/consistency considerations.

BRIEF DESCRIPTION OF THE DRAWINGS

Other objects and advantages of the invention will become apparent upon reading the following detailed description and upon reference to the accompanying drawings in which:

FIG. 2A is a block diagram of selected features of a data processing system according to one embodiment of the invention;

FIG. 2B is a conceptualized depiction of a distributed shared memory according to one embodiment of the present invention.

Figure 1:
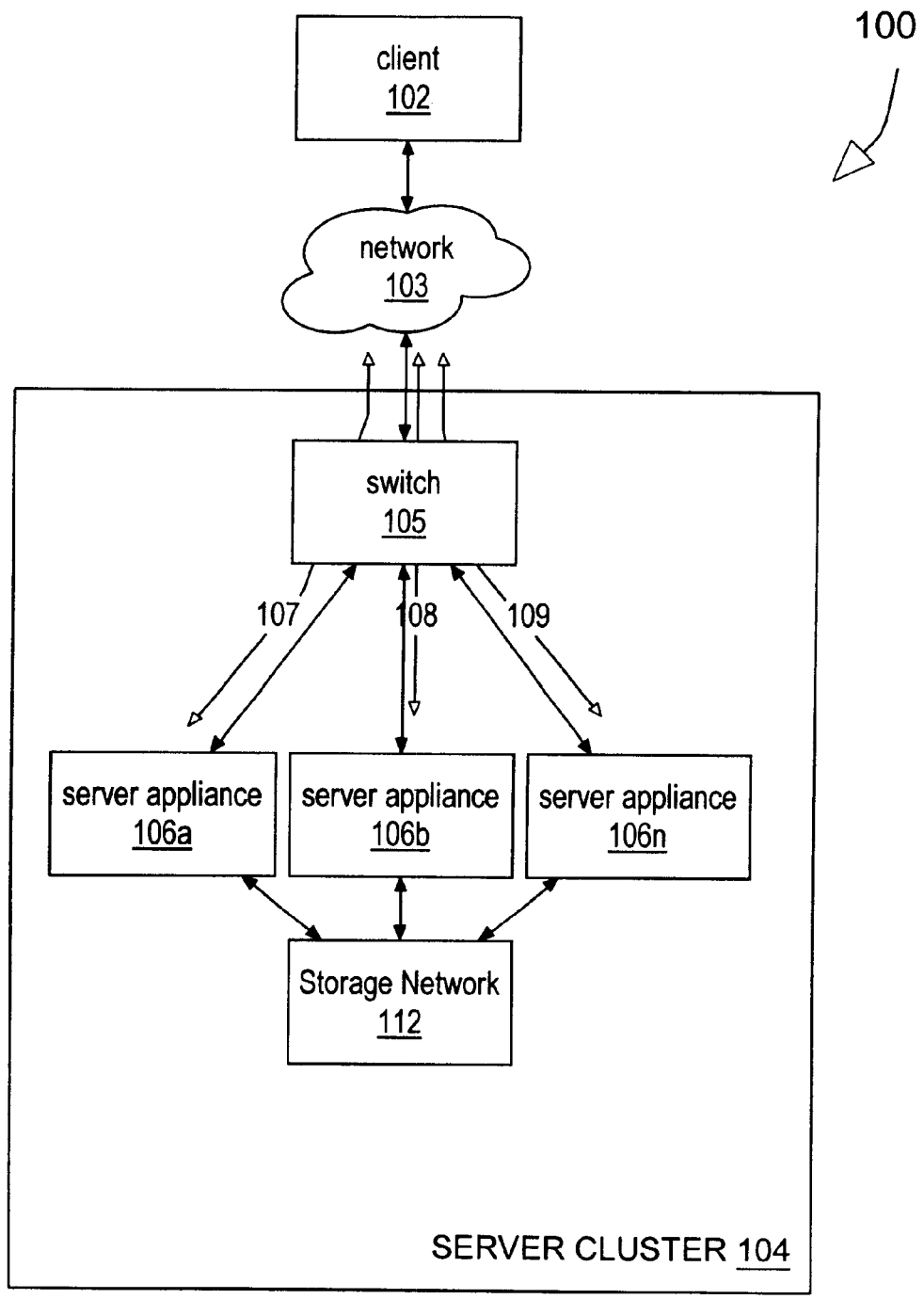
FIG. 1 is a block diagram of selected features of a data processing network suitable for use with one embodiment of the present invention.

While the invention is susceptible to various modifications and alternative forms, specific embodiments thereof are shown by way of example in the drawings and will herein be described in detail. It should be understood, however, that the drawings and detailed description presented herein are not intended to limit the invention to the particular embodiment disclosed, but on the contrary, the intention is to cover all modifications, equivalents, and alternatives falling within the spirit and scope of the present invention as defined by the appended claims.

DETAILED DESCRIPTION OF THE INVENTION

Turning now to the drawings, FIG. 1 illustrates selected components of a data processing network and a typical client-server session that occurs thereon. In the depicted embodiment, a data processing network 100 includes a client 102 connected to a network represented by reference numeral 103. Client 102 typically runs an application program, such as a conventional web browser, running on a data processing device such as a desktop or laptop computer, a network computer, or another suitable network aware device such as an Internet enabled phone or personal digital assistant (PDA). Network 103 may represent, in various implementations, a Local Area network (LAN) such as an intra-office Ethernet network, or a Wide Area Network (WAN) such as the Internet. Client 102 typically includes an application program, an application program interface (API), and suitable networking hardware such as a standard network interface card, for communicating with a server device over network 103.

The depicted embodiment of data processing network 100 includes a server cluster 104 connected to the network. Server cluster 104 represents an increasingly common inplementation for providing web-based services. Server cluster 104 includes multiple server appliances 106a, 106b, and 106n respectively (generically or collectively referred to herein as server appliance(s) 106). As used in this disclosure, the term server appliance refers to a server device dedicated to a particular purpose such as providing a web server. Each server appliance may be implemented as a diskless machine, each with its own corresponding volatile system memory. Each server appliance 106 communicates with network 103 via an intermediate switch 105. Switch 105 may include its own dedicated processor or set of processors and is designed for switching network traffic, monitoring server appliances 106 in the cluster, and directing client requests to server appliances 106 based upon factors included server appliance loading.

In an embodiment where server appliances 106 are implemented as diskless devices, each server appliance is connected through an appropriate network to mass non-volatile storage, referred to herein as networked storage 112, that may be implemented with magnetic or optical disks. Networked storage 112, which may be implemented as a one or more network attached storage devices or as a storage area network, typically includes a high speed interconnect for communicating requests between server appliances 106 as well as the physical disks themselves. Using diskless server appliances in combination with networked storage accessible to each of the server appliances enables server cluster 104 to distribute the various request that comprise a client-server communication session among the various server appliances to obtain improved performance or some other desired result.

A typical client-server session may include multiple requests issued by client 102. Server cluster 104 and switch 105 may distribute the various requests to different server appliances 106 based upon availability or function (i.e., certain appliances may be to handle different aspects of a typical client-sever session). FIG. 1 illustrates a typical session in which the first request (represented by reference numeral 107) from client 102 to server cluster 104 is routed by switch 105 to the first server appliance 106a, a second request 108 is routed to second appliance 106b, and a third request 109 is routed to server appliance 106n.

Although the various requests comprising the client-server session are routed to different server appliances 106, it is reasonable to assume that two or more of the individual requests may reference one or more common objects in memory. In the typical implementation, each memory object referenced produces a sequence of calculations and perhaps fetches from the networked storage 112. This sequence of operations generates the requested object. The disk accesses are typically time consuming not only because of the relatively long access time associated with non-volatile mass storage devices, but also because of the significant network protocol processing that takes place with each access. Because networked storage 112 may be connected as part of the local area network, requests for data may be formatted according to a complete LAN protocol. Even in an embodiment where networked storage 112 is implemented with a Fibre Channel SAN, there may still be considerable networking protocol associated with disk requests. It is this "network latency" that potentially degrades the performance of server cluster 104 in comparison to conventional server appliance clusters in which each server device includes its own local hard disk.

Generally speaking the present invention contemplates leveling the performance of diskless-appliance-based server clusters relative to their disk-based counterparts by employing a software-based, distributed shared memory (DSM) abstraction among two or more of the server appliances 106 that comprise server cluster 104. The DSM abstraction is configured to improve client-server session performance where there is sufficient volatile system memory in each server appliance 106 to accommodate one or more DSM groupings and where there is a hardware interconnect with sufficient bandwidth to enable high speed inter-appliance memory transactions. Fortunately, the diskless, server appliance-based server cluster 104 depicted in FIG. 2A typically includes both of these characteristics. Server appliances 106 are typically designed with large volatile system memories (often more than 1 GB of DRAM or the like) and may frequently include the maximum addressable memory of 4 GB (assuming a 32-bit addressing scheme). In addition, the network 103, when implemented in high-speed Ethernet or other suitable network connection, provides an appropriate connection between processors of the various server appliances that comprise the network. Moreover, the protocol requirements for inter-processor memory transactions is typically less than the full-blown protocol transaction required of accesses to networked storage 112 thereby further differentiating the performance between the conventional system and the present invention.

Turning now to FIG. 2A, a conceptualized depiction of a server cluster 104 suitable for use in the present invention is depicted. Server cluster 104 includes multiple server appliances 106. In the depicted embodiment, each server appliance 106 is represented by a processor 115 and a corresponding volatile system memory 116. Thus, server appliance 106a includes a corresponding processor 115a and system memory 116a, server appliance 106b includes processor 115b and system memory 116b, and so forth. Although the depicted embodiment indicates a single processor 115 associated with each server appliance 106, the invention is intended to encompass multi-processor embodiments wherein each server appliance 106 includes two or more processors. Each processor 115 is connected to its corresponding system memory 116 through an intervening memory bus 118. In the depicted embodiment, inter-server communication is facilitated by an interconnect 210. Interconnect 210 may represent a high speed network connection such as an Ethernet connection. In other embodiments, an I/O bus such as the Peripheral Component Interface (PCI) bus may serve as interconnect 210.

Turning now to FIG. 2B, a conceptualized illustration of the distributed shared memory abstraction that is applied to server cluster 104 according to one embodiment of the invention is illustrated. In the depicted embodiment, first and second processes 121 and 122 respectively are depicted as executing on a first server 116a, third and fourth processes 123 and 124 are executing on second server 116b, while fifth and sixth processes 125 and 126 are executing on third server 116c. Although each server 116 is shown as running two processes, it will be appreciated that more or fewer processes may be executing on each server 116. It is assumed that these processes are processing requests made by clients of the server cluster.

In the depicted embodiment, a DSM abstraction results in the creation of two DSM spaces or groups 201a and 201b (generically or collectively referred to as DSM space(s) 201). In a first DSM group 201a, first process 121, second process 122, third process 123, and fourth process 124 all share a portion of their respective virtual address spaces in common while fourth process 124 shares a portion of its address space with fifth process 125. For purposes of this disclosure, first process 121, second process 122, third process 123, and fourth process 124 are said to be subscribed to first DSM group 201a while fourth process 124 and fifth process 125 are subscribed to second DSM group 201b. When two or more processes are subscribed to a DSM group 201, the portion of each of the subscribing process's virtual space that belongs to the group 201 is mapped as a common space. The portion of virtual space subscribed to the group is indicate in FIG. 2B by the reference numeral 130.

The DSM abstraction allows the subscribing processes to assume a shared virtual memory with other subscribing processes even though the processes may execute on server appliances 106 that do not physically share memory. Thus, each process can access any data object without the programmer having to worry about where the data is or how to obtain its value. For further details regarding a specific implementation of software based DSM, the reader is referred to C. Amza et al., *TreadMarks: Shared Memory Computing on Network of Workstations* (IEEE February 1996), which is incorporated by reference herein.

The DSM abstraction that produces DSM groups 201 as contemplated herein is preferably implemented in software. Thus, the DSM abstraction may comprise a sequence of computer instructions embodied in a suitable computer readable medium such as a random access memory (RAM), non-volatile memory such as a Read Only Memory (ROM) or flash memory card, or a non-volatile, bulk storage device such as a floppy diskette, a hard disk, a CD ROM device, a magnetic tape, or another suitable storage device.

In one embodiment, processes 121, 122, etc. executing on server cluster 104 subscribe to and unsubscribe from DSM groups 201 as needed to optimize the benefits provided by the DSM abstraction without unnecessarily consuming the available physical address space. Thus, as depicted in FIG. 2B, DSM group 201a includes a portion of system memory 116a and system memory 116b. Imagine that each system memory 116 includes 1 GB of physical memory and that each portion 130 within DSM group 201a represents one or more pages of memory. The sharing of each page of address space between two processes executing on different server appliances effectively reduces the physical memory that is available for other processes. Therefore, the ability to subscribe applications to DSM groups 201 temporarily beneficially conserves valuable system memory while providing the benefits of shared memory (i.e., transparent references to data objects, shared memory synchronization) while maximizing available memory. Moreover, the assignment of physical memory pages to the shared portion 130 of a subscribing process's virtual memory may occur incrementally in response to specific memory reference patterns. In this embodiment, when a process that is subscribed to a group 201 references an object that resides on a virtual page, the DSM abstraction may expand the pool of physical pages used to support the shared portion to incorporate a physical page to hold the recently referenced object.

The subscribing to DSM groups 201 may occur in a reactive manner where a process subscribes to a DSM group 201 upon discovering, for example, that a memory object referenced by the process was recently referenced by another process running on a different server appliance. This situation may occur frequently in a server cluster 104 designed to provide a web-based service such as a traditional web server. In this environment, a single session or multiple requests for the same web page may be serviced by processes executing on two or more server appliances 106 depending upon their respective loading as determined by the switch 105 depicted in FIG. 1. Two or more processes may subscribe to a DSM space 201 while a particular client-server session is maintained. At the conclusion of the session, the DSM abstraction may then un-subscribe the processes (and their shared memory space) from the DSM space by de-allocating the portion of their respective system memories 116 that were allocated to the DSM space. In the case of multiple requests for the same web pages, the DSM area may act as a cache.

Figure 3:
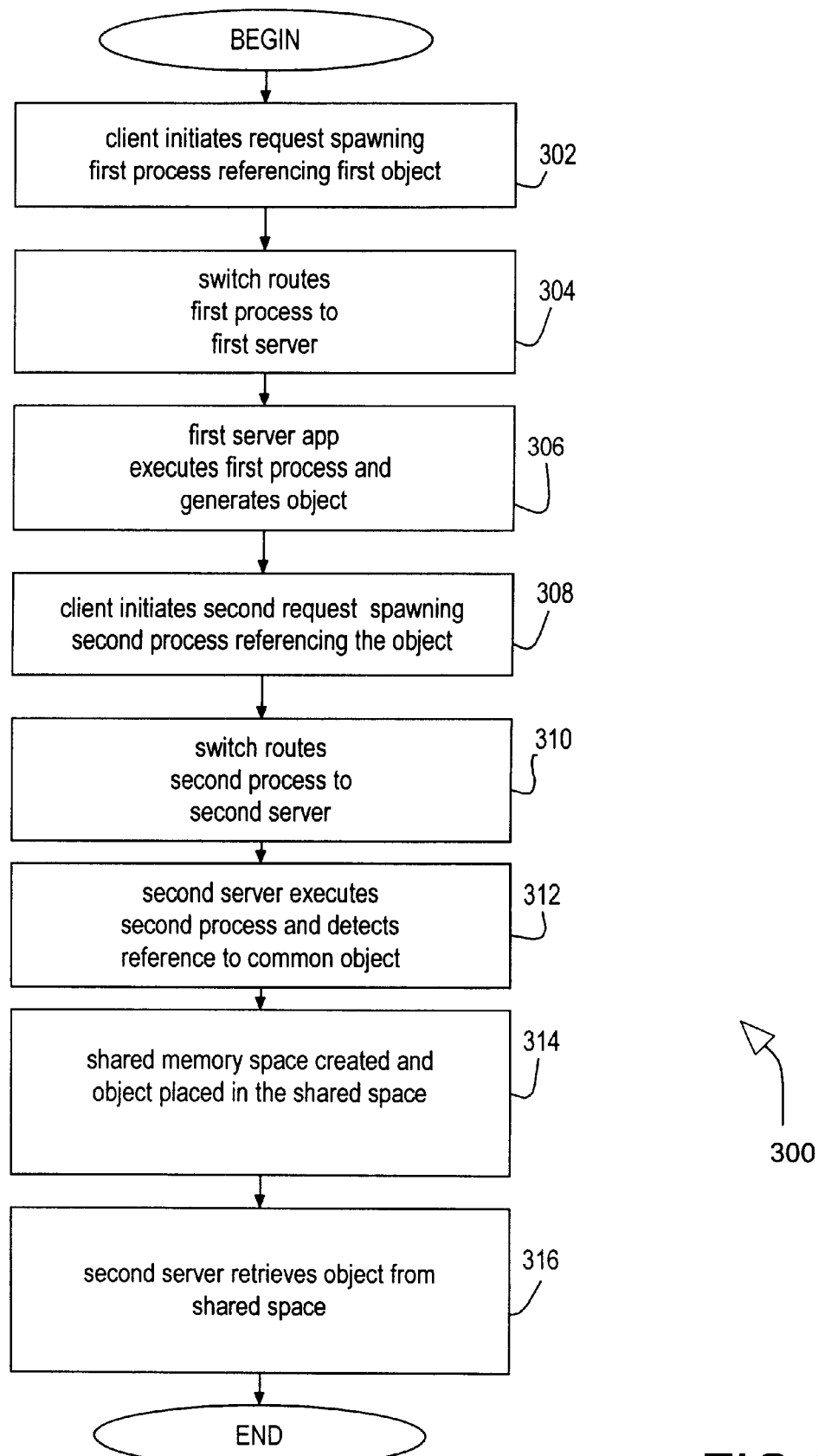
FIG. 3 is a flow diagram of a method by which a network cluster services request during a client-server session.

Referring now to FIG. 3, a flow diagram illustrates a method 300 by which the server cluster 104 and its component server appliances 106 assign DSM spaces 201. Initially, in block 302, a request from a client application targets server cluster 104. The initial request is sent over the network 103, received by switch 105, and routed (block 304) to an appropriate server appliance such as, for example, server appliance 106a based upon the current loading of the various server appliances 106 or upon some other criteria such as the type of request. In any event, the request is serviced by a first process executing on first server appliance 106a and includes a reference to a memory object. Assuming that the referenced object does not reside in the system memory 116a of server appliance 106a, the object may be generated by an appropriate combination of retrieving data from disk via networked storage 112 and calculating by processor 115a (FIG. 2A). After the first process generates (block 306) the referenced object and returns data to client 102, the client-server session may continue by initiating a second request (block 308) where the second request is assigned to a second process. The second process may include a reference to an object referenced in and generated by the first process. If the second process executes on second server appliance 106b, the second server detects (block 312) the reference to an object that was recently referenced by another server appliance.

The DSM abstraction may implement the detection of a potentially shareable objects by maintaining a cache of objects (the DSM object cache). When a process references an object, the DSM abstraction checks the DSM object cache. If the object is found in the DSM cache, the object is returned to the referencing application. In this manner, the referencing process need only refer to the object without worrying about the physical location of the object. The cache look-up can be achieved using a hash table, an index, or any one of a number of other methods. As new objects are added to the DSM cache, the cache look-up information maintained on other server appliances may be updated by appropriate message passing between server appliances 106.

Alternatively, the index hash table or lookup data may reside in a common, distributed shared memory area. When a second sever needs an object, it looks the object up in the common area. If the object is found, the second process may subscribe to a DSM group by creating a portion 130 of shared memory space to gain access to the object.

In this manner, a shared memory space is used (block 314) when the second process references a data object that was generated by the first process and the data object is placed in the shared memory space. The second server is therefore able to access or retrieve (block 316) the data object from the shared memory space without accessing the networked storage.

In addition to creating DSM spaces 201 based upon server activity and process memory accesses as described above with respect to FIG. 3, DSM spaces 201 may be assigned empirically based upon some predetermined arrangement. Selected processes, for example, may be dedicated to performing a specific task or set of related tasks for the entire server cluster 104, and portions of the these processes may be designated as a belonging to a DSM space 201.

To simplify issues of consistency and currency of the objects within a DSM space 201, one embodiment of the invention limits the types of objects that are subject to the DSM abstraction. In a web based server application, a relatively few types of objects account for a significant percentage of the types of objects that are likely to be referenced in a typical session. These object types include, for example, Java® servlet classes, Enterprise JavaBean® (EJB) objects, CGI scripts, mod_perl scripts, static HTML pages, static images, and PHP scripts. The object types to which the DSM abstraction is available may be limited to read-only objects to simplify the DSM implementation. Read only objects are easier to manage in a DSM environment because all replications of an object are guaranteed to be current.

Returning now to FIG. 2B, the depicted embodiment of server cluster 104 illustrates that a process may be subscribed to multiple DSM spaces 201 simultaneously. The fourth process 124, for example, is subscribed to a first DSM space 201a, through which the process shares a common portion of virtual address space with first, second, and third processes 121, 122, and 123 respectively. Fourth process 124 is further subscribed to a second DSM space 201b, through which the process shares a common portion of virtual address space with fifth process 125. In this arrangement, the portion 130 of fourth process that is shared with first process 121 is mutually exclusive of the portion 131 that is shared with fifth process 125.

It will be apparent to those skilled in the art having the benefit of this disclosure that the present invention contemplates a system and method for managing data objects in a server cluster environment. It is understood that the form of the invention shown and described in the detailed description and the drawings are to be taken merely as presently preferred examples. It is intended that the following claims be interpreted broadly to embrace all the variations of the preferred embodiments disclosed

What is claimed is:

1. A method of managing data object references in a server cluster, comprising:
   responsive to a first process that executes on a first server device in the server cluster referencing a data object, retrieving data from disk, generating the data object using the retrieved data, and storing the generated object in memory of the first server device;
   responsive to a second process that executes on a second server device of the cluster referencing the previously generated data object, creating or using a shared virtual memory space between the first and second server appliances; and
   placing the generated data object in the shared memory space wherein the second server device may retrieve at least a portion of the data object using the shared memory space without accessing disk.

2. The method of claim 1, wherein the first process and the second process service portions of a single client-server session.

3. The method of claim 1, wherein creating the shared memory space comprises creating a distributed shared memory cache in which the referenced objects are stored.

4. The method of claim 1, wherein creating the shared memory space comprises creating an index identifying recently referenced data objects.

5. The method of claim 1, wherein creating the shared memory space includes creating the shared memory space if the referenced object generated by the first server device is a read only object.

6. The method of claim 1, wherein creating the shared memory space includes creating the shared memory space if the referenced object generated by the first server device is selected from the group of objects type consisting of Java servlet classes, Enterprise JavaBean (EJB) objects, CGI scripts, mod_perl scripts, static HTML pages, static images, and PHP scripts.

7. The method of claim 1, wherein the first and second server devices comprise diskless devices and wherein retrieving data from disk comprises retrieving data from networked storage.

8. The method of claim 1, wherein the shared virtual memory space comprises a temporary shared virtual memory space and further wherein the shared space is subsequently eliminated to conserve the available physical memory.

9. A server cluster, comprising
   a first server device comprising at least one processor and memory;
   a second server device comprising process and memory connected to the first server device by an interconnect;
   a switch connected to the first and second server devices and suitable for connecting the server cluster to a network; and
   server cluster computer code means for creating or using a shared memory space responsive to the second server device executing a second process that references a data object that was generated by a first process executing on the first server device and computer code means for placing the generated data object in the shared memory space and wherein the second server retrieves the data object from the shared memory.

10. The server cluster of claim 9, wherein generating the data object by the first server device includes retrieving data from disk and further wherein the second server retrieves the data object from the shared memory without accessing disk.

11. The server cluster of claim 9, wherein the first process and the second process service portions of a single client-server session.

12. The server cluster of claim 9, wherein creating or using the shared memory space comprises creating a distributed shared memory cache in which the referenced objects are stored.

13. The server cluster of claim 9, wherein creating or using the shared memory space comprises creating an index identifying recently referenced data objects.

14. The server cluster of claim 9, wherein creating the shared memory space includes creating or using the shared memory space if the referenced object generated by the first server device is a read only object.

15. The server cluster of claim 9, wherein creating the shared memory space includes creating or using the shared memory space if the referenced object generated by the first server device is selected from the group of objects type consisting of Java servlet classes, Enterprise JavaBean (EJB) objects, CGI scripts, mod_perl scripts, static HTML pages, static images, and PHP scripts.

16. The server cluster of claim 9, wherein the first and second server devices comprise diskless devices and wherein retrieving data from disk comprises retrieving data from networked storage of the server cluster.

17. The server cluster of claim 16, wherein the networked storage comprises a storage area network.

18. The server cluster of claim 9, wherein the shared virtual memory space comprises a temporary shared virtual memory space and further wherein the shared space is subsequently eliminated to conserve the available physical memory.

19. A computer program product comprising:
   responsive to a first process that executes on a first server device in a server cluster referencing a data object, computer code means for retrieving data from disk, generating the data object using the retrieved data, and storing the generated object in memory of the first server device;
   responsive to a second process that executes on a second server device of the cluster referencing the previously generated data object, computer code means for creating or using a shared memory space between the first and second server appliances; and
   computer code means for placing the generated data object in the shared memory space wherein the second server device may retrieve at least a portion of the data object using the shared memory space without accessing disk.

20. The computer program product of claim 19, wherein the computer code means for creating or using the shared memory space comprises computer code means for creating or using a distributed shared memory cache in which the referenced objects are stored.

21. The computer program product of claim 19, wherein the computer code means for creating or using the shared memory space comprises code means for creating an index identifying recently referenced data objects.

22. The computer program product of claim 19, wherein the computer code means for creating or using the shared memory space includes code means for creating the shared memory space if the referenced object generated by the first server device is a read only object.

23. The computer program product of claim 19, wherein the code means for creating the shared memory space includes code means for creating or using the shared memory space if the referenced object generated by the first server device is selected from the group of objects type consisting of Java servlet classes, Enterprise JavaBean (EJB) objects, CGI scripts, mod_perl scripts, static HTML pages, static images, and PHP scripts.

24. The computer program product of claim 19, wherein the computer code means for creating or using a shared memory space between the first and second server appliances comprises code means for creating a temporary shared virtual memory space and further comprising code means for subsequently eliminating the shared space to conserve the available physical memory.

* * * * *